United States Patent [19]

Aufrere

[11] Patent Number: 5,626,395
[45] Date of Patent: May 6, 1997

[54] SEAT BASE FRAMEWORKS FOR VEHICLE SEATS

[75] Inventor: Christophe Aufrere, Marcoussis, France

[73] Assignee: Bertrand Faure Equipements SA, Boulogne, France

[21] Appl. No.: 574,915

[22] Filed: Dec. 19, 1995

[30] Foreign Application Priority Data

Dec. 20, 1994 [FR] France .................................. 94 15323

[51] Int. Cl.⁶ .................................................. A47C 7/02
[52] U.S. Cl. ............................ 297/452.18; 297/344.15
[58] Field of Search .......................... 297/452.18, 452.1, 297/344.12, 344.15; 248/421, 157

[56] References Cited

U.S. PATENT DOCUMENTS

| | | |
|---|---|---|
| 2,720,914 | 10/1955 | Doty et al. . |
| 4,057,214 | 11/1977 | Harder, Jr. ............... 297/452.18 X |
| 4,598,950 | 7/1986 | Fourrey . |
| 4,673,215 | 6/1987 | Yokoyama ................ 297/452.18 |
| 4,993,778 | 2/1991 | Colin et al. . |
| 5,199,679 | 4/1993 | Nakamura et al. ............. 248/421 X |
| 5,310,154 | 5/1994 | Ueda et al. ................ 297/452.18 X |
| 5,328,248 | 7/1994 | Nishijama .................. 297/452.18 X |

FOREIGN PATENT DOCUMENTS

| | | |
|---|---|---|
| 0104853 | 4/1984 | European Pat. Off. . |
| 0120747 | 10/1984 | European Pat. Off. . |
| 0363261 | 4/1990 | European Pat. Off. . |
| 4039100 | 6/1992 | Germany . |
| 4303006 | 8/1994 | Germany . |

Primary Examiner—Laurie K. Crammer
Attorney, Agent, or Firm—Larson and Taylor

[57] ABSTRACT

A seat base framework for vehicle seats includes a frame made of section pieces which includes two lateral longitudinal members and a front cross member. This frame consists of two rigid section pieces which have an overall U-shape, the bases of the two section pieces being arranged parallel to one another toward the front to form the cross member of the frame and the lateral branches of the two section pieces forming the two lateral longitudinal members of the frame in association with two vertical rigid plates, the rear ends of the lateral branches of the same longitudinal member being separated from one another vertically and fastened to one of the rigid plates, and the two section pieces being fastened rigidly to one another at two front fastening points.

12 Claims, 5 Drawing Sheets

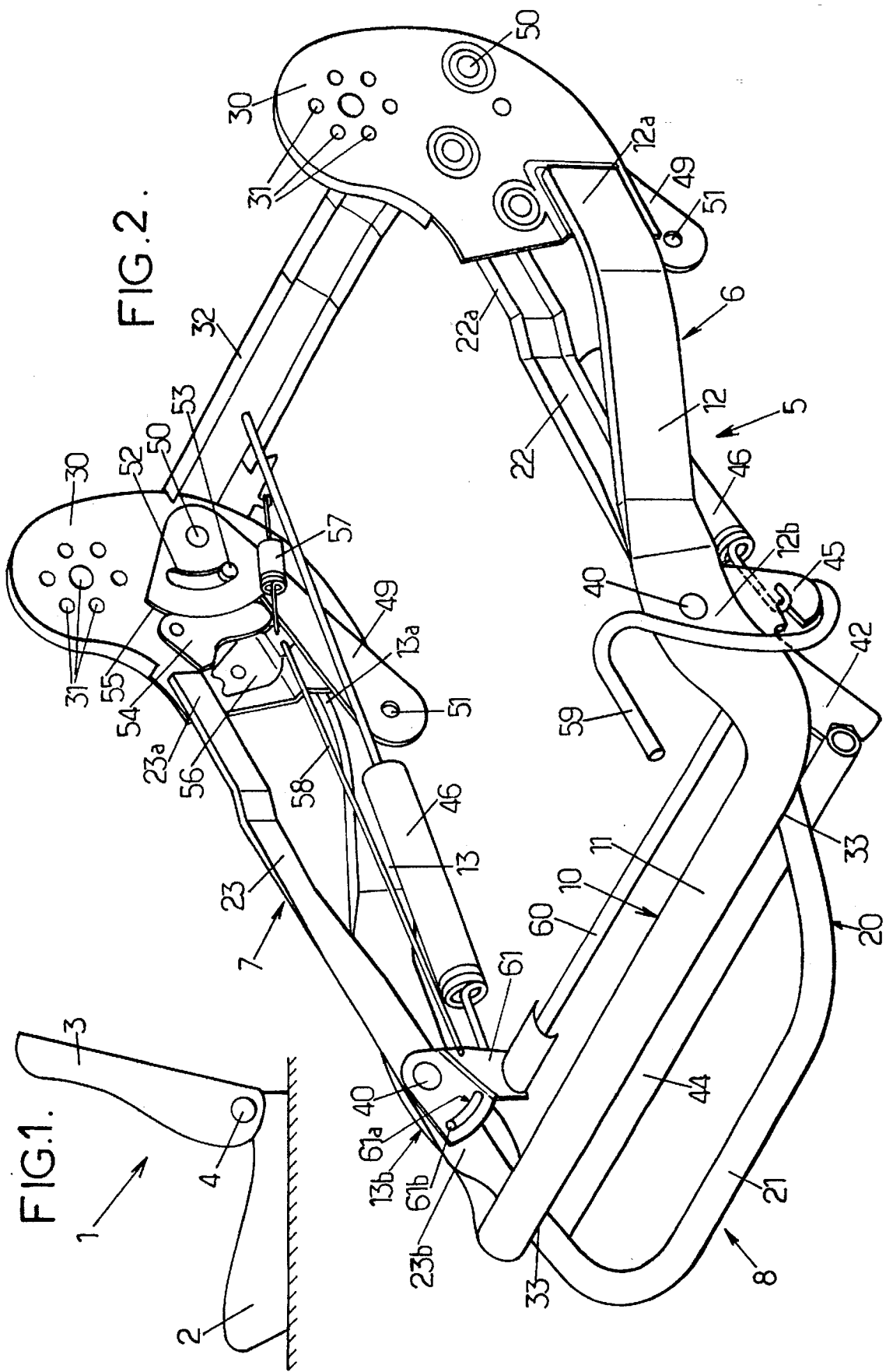

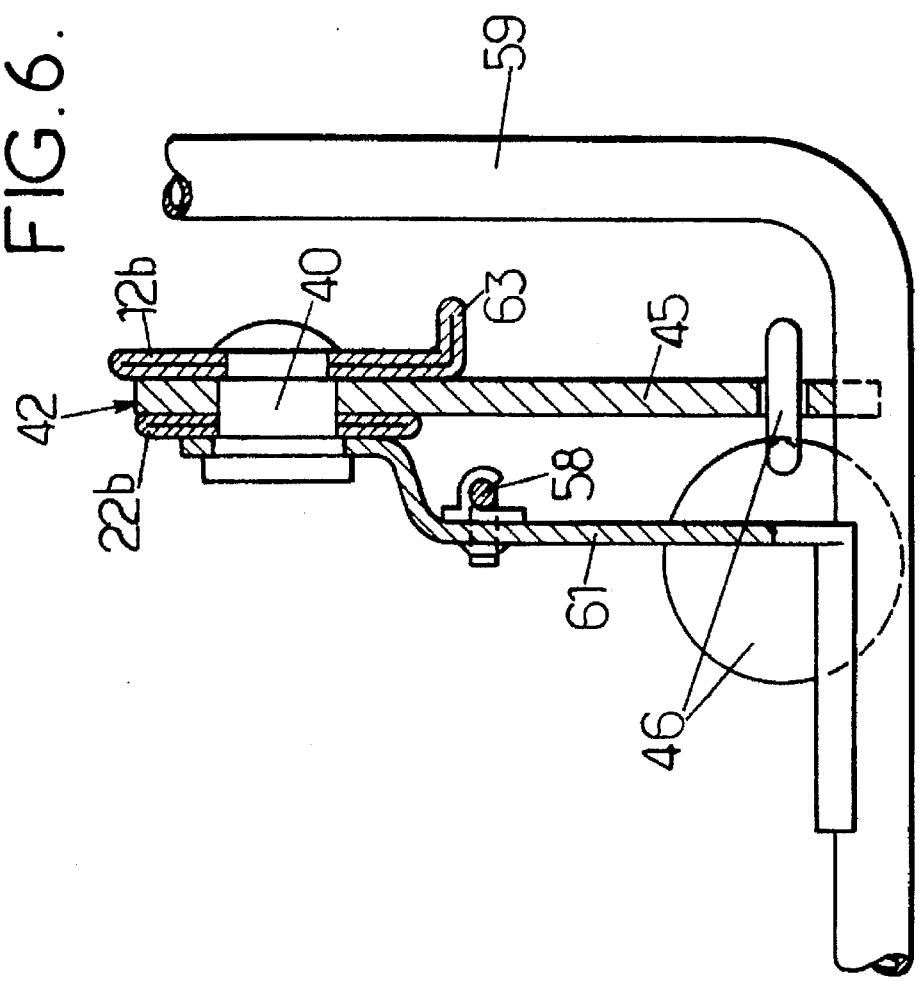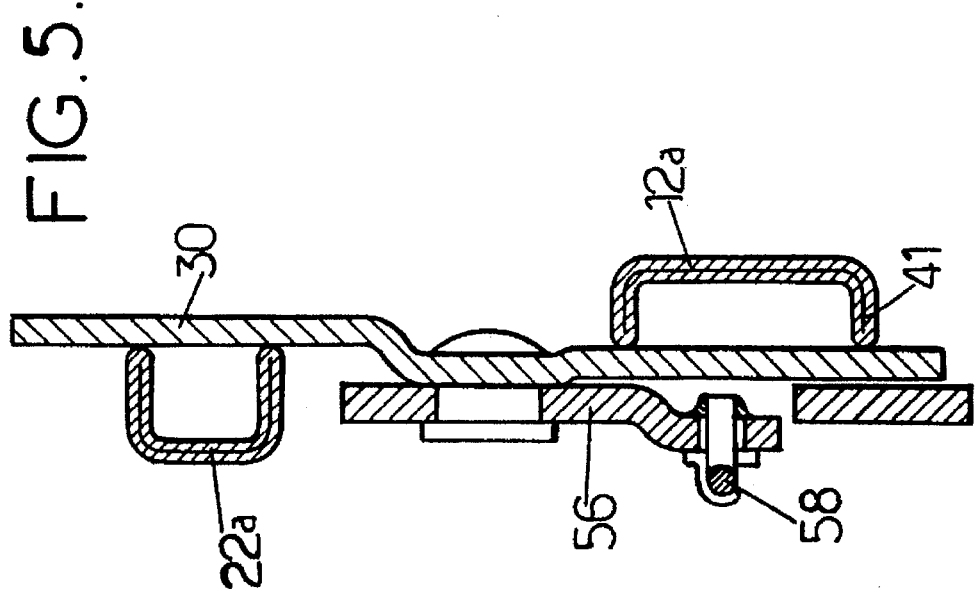

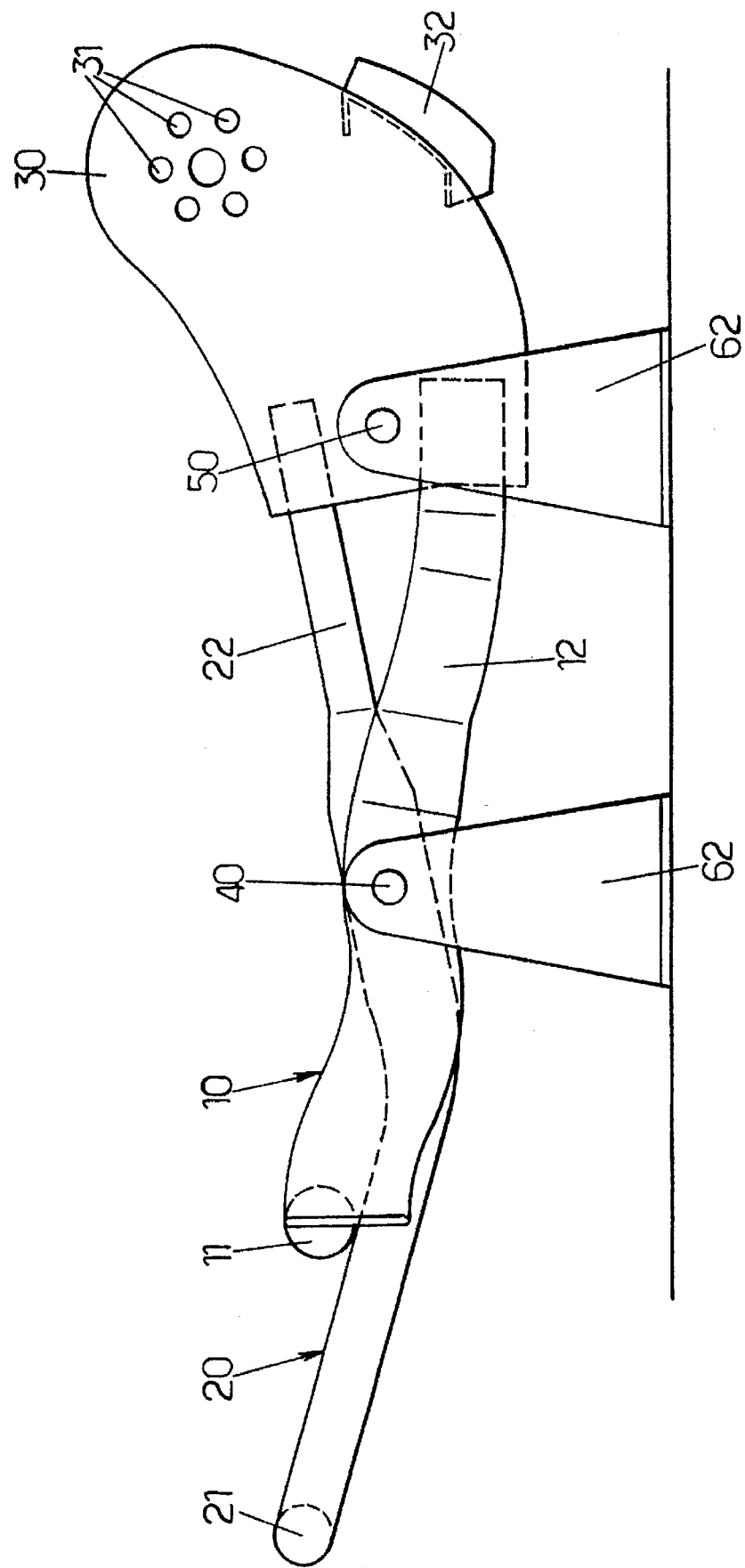

SEAT BASE FRAMEWORKS FOR VEHICLE SEATS

The present invention relates to seat base frameworks for vehicle seats.

Among these seat base frameworks, the invention is aimed more specifically at those which are intended for vehicle seats which have a seat base and a backrest, these frameworks including a frame made of section pieces with a tubular or non-tubular cross section, this frame including two lateral longitudinal members, each one extending between a rear end and a front end, the respective rear ends of the two lateral longitudinal members being intended for the mounting of the backrest of the seat and the respective front ends of these longitudinal members being joined together by a front cross member.

These seat base frameworks which are provided with a frame made of section pieces are preferable to those in which the frame is made of solid sheet metal, because they are lighter and less expensive.

However, these frameworks with a frame made of section pieces have the drawback of displaying limited mechanical strength, particularly with regard to the torques that the seat backrests may exert on them.

What happens is that the backrest of a seat may exert a substantial torque on the seat base framework of this seat, particularly when the vehicle is involved in a traffic accident.

This torque may for example reach 200 m.daN in the case of a rear impact on the vehicle, or more than 500 M.daN in the case of a front impact if the seat has a so-called "on board" seat belt, the upper fastening point of which is attached to the backrest of the seat.

The object of the present invention is especially to improve the mechanical strength of the seat base frameworks with frames made of section pieces, without making them appreciably more expensive, and without making them heavier, and even reducing their cost and/or their weight.

To this end, according to the invention, a seat base framework of the sort in question is essentially characterized in that the frame of the framework includes two rigid section pieces of similar dimensions which have an overall U shape, with a base arranged towards the front and two lateral branches which extend backwards from the base as far as rear ends, the respective bases of the two section pieces being arranged substantially parallel to one another to form the front cross member of the frame, each lateral longitudinal member being formed by two lateral branches belonging respectively to the two section pieces, associated with a vertical rigid fastening plate, the rear ends of these two lateral branches being separated from one another vertically and being fastened to the said fastening plate, and the two section pieces being fastened rigidly to one another at two front fastening points situated respectively close to each lateral longitudinal member and towards the front of the frame.

Each lateral longitudinal member thus has a cross-braced structure which gives it high mechanical strength especially with respect to the torques which may be exerted by the backrest of the seat, and this is achieved without making the seat base framework appreciably heavier or more expensive.

In preferred embodiments, recourse is further had to one and/or other of the following provisions:

- the two rigid section pieces are fastened together by welding at the two front fastening points, the rear ends of the two section pieces also being fastened by welding to the two fastening plates, each lateral longitudinal member including a horizontal pivot which joins together the two lateral branches belonging to this lateral longitudinal member, this pivot being arranged between, on the one hand, the front fastening point situated close to the said lateral longitudinal member and, on the other hand, the rear ends of the said two lateral branches, and the two pivots corresponding to the two lateral longitudinal members being aligned on a common axis; these provisions in particular allowing easy and reliable mounting of the seat base framework, as will be explained later;
- the two lateral branches of one of the two rigid section pieces, known as the first section piece, are separated from each other slightly less than the two lateral branches of the other of the two rigid section pieces, known as the second section piece, the two lateral branches of the first section piece extending forwards beyond the base of the second section piece, and the two front fastening points each consisting of a point of contact between one lateral branch of the first section piece and the base of the second section piece;
- the two lateral branches of the section piece which belong to the same lateral longitudinal member intersect vertically at the pivot which joins them together;
- the first section piece includes a front portion which projects forwards from the base of the second section piece, this front portion being arranged under the said base of the second section piece; these provisions particularly facilitate the fastening of the front part of a cover which covers the seat base cushion, the front part of this cover exhibiting, in vertical section, the shape of a crook which penetrates under the front portion of the first section piece, this front part of the cover being tightened over the front portion of the first section piece by pleating, and more specifically by gathering or using a drawstring;
- each pivot which joins together the lateral branches of the section pieces is also joined to a support leg which supports the seat base framework and is mounted in the manner of a fork joint between the said lateral branches of the two section pieces;
- the support leg is an articulated link allowing height adjustment of the seat base framework;
- each of the fastening plates is also mounted on an articulated link allowing height adjustment of the seat base framework;
- the seat base framework further includes a mechanism for immobilizing the links, this mechanism being controlled by means of a lever mounted so that it can pivot on at least one of the two pivots which join together the lateral branches of the rigid section pieces;
- the lateral branches of the section piece which belong to the same lateral longitudinal member exhibit a lower lateral branch including at least one substantially horizontal lower rim which extends towards the inside of the frame; these provisions facilitating the lateral hooking of the seat base cushion cover over the seat base framework.

Another subject of the invention is a method for manufacturing a seat base framework as defined herein-above when the lateral branches of the rigid section pieces are joined together in pairs by pivots, this method including the following steps:

a) placing the two section pieces in a position close to the position which they are to occupy in the seat base framework, b) fastening the lateral branches of these section pieces together in pairs by means of the pivots, c) welding the two section pieces together at the two front fastening points, d) and welding the rear ends of the two section pieces to the fastening plates.

This method allows reliable mounting of the seat base framework without imposing excessively high stresses on the welds, and achieves this even with relatively wide tolerances on the dimensions of the section pieces.

Step a) may optionally include placing two support legs in a position close to the position which they are to occupy in the seat base framework, and step b) may then include mounting the two support legs in the manner of a fork joint between the lateral branches of the two section pieces.

Further features and advantages of the invention will emerge during the following detailed description of two of its embodiments, given by way of non-limiting examples with respect to the attached drawings.

IN THE DRAWINGS

FIG. 1 is a diagrammatic view showing one example of a seat in which the seat base framework can be produced according to the invention.

FIG. 2 is a perspective view of a height adjustable seat base framework according to one embodiment of the invention.

FIGS. 5 and 6 are views in section on V—V and VI—VI of FIG. 3 respectively.

FIG. 7 is a side view of a variation on the seat base framework of FIGS. 2 to 6, without the option of height adjustment.

In the various figures the same references denote identical or similar elements.

Figure 3:
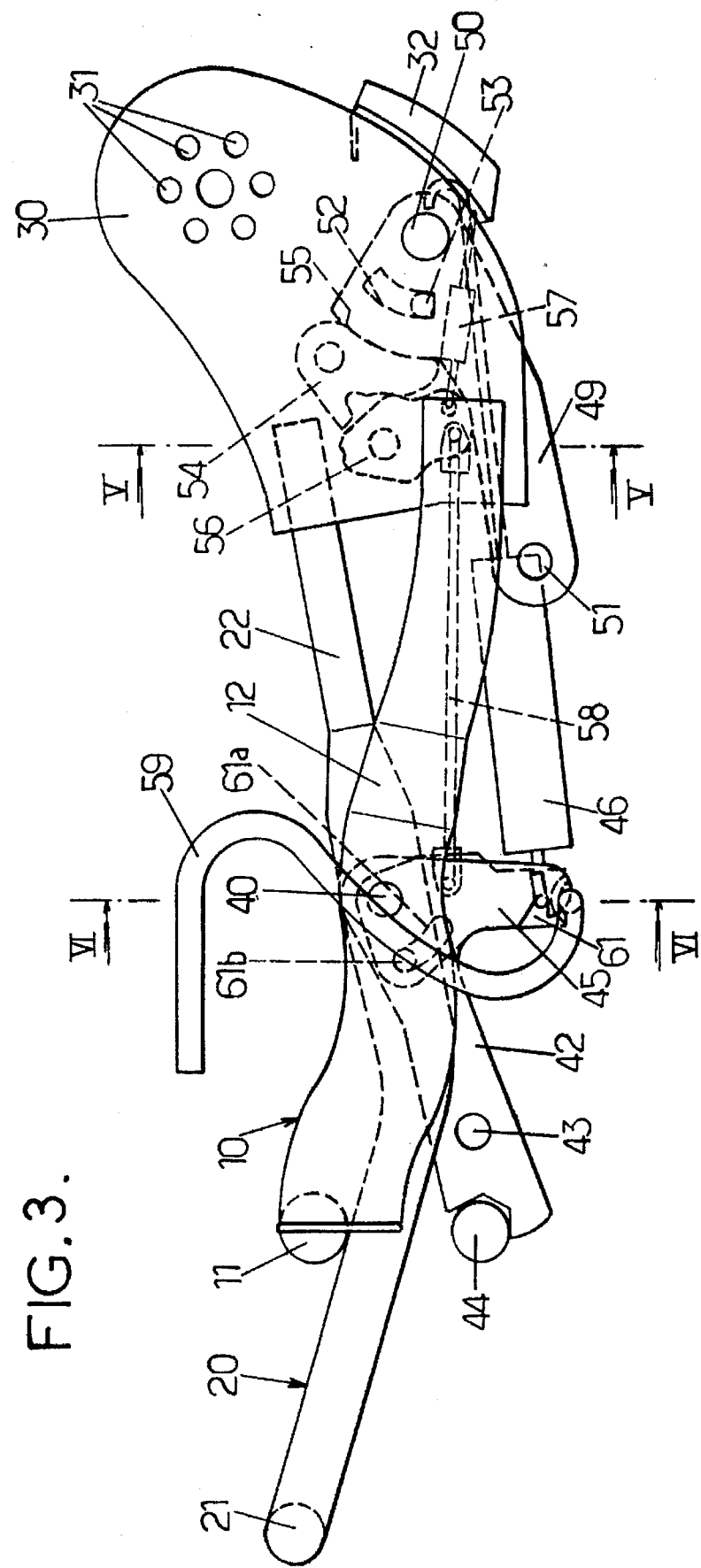
FIGS. 3 and 4 are side views of the seat base framework of FIG. 2, in a low position and in a high position respectively.

As represented diagrammatically in FIG. 1, the invention relates to a framework for the seat base 2 of a vehicle seat 1, especially a motor car seat, this seat including a backrest 3 which is generally joined to the seat base framework by an articulation 4 which allows the inclination of the backrest 3 to be adjusted.

As represented in FIG. 2, the seat base 2 framework of the seat consists of a frame 5 consisting for the most part of metal section pieces, it being possible for these section pieces to be tubular or to have an open section. The frame 5 supports a seat base cushion (not represented), generally by means of a web of metal wires or of a sheet metal bucket.

The frame 5 includes two lateral longitudinal members 6 and 7 which are joined together at their front ends by a front cross member 8, and the rear ends of which are designed for the mounting of the framework of the backrest 3.

According to the invention, the frame 5 includes two metal section pieces 10 and 20 of similar dimensions, which have an overall U shape.

Each of these two section pieces 10 and 20 exhibits a base, 11 and 21 respectively, arranged forwards, and two lateral branches 12, 13 and 22, 23 respectively, which extend towards the rear from the base as far as rear ends 12a, 13a and 22a, 23a respectively.

In the example represented in the drawings, each of the section pieces 10 and 20 exhibits a tubular shape with a substantially circular section at its base, 11 and 21 respectively, then this tubular section piece has a flattened cross section in the region of the lateral branches 12, 13 and 22, 23 respectively, as may be seen in FIGS. 5 and 6.

More specifically, each of the section pieces 10 and 20 has a region of vertically flattened cross section 12b, 13b and 22b, 23b respectively, close to the front end of each of its lateral branches, then the lateral branches extend towards the rear with a substantially U-shaped cross section which is open towards the outside of the frame in the case of the section piece 20, and open towards the inside of the frame in the case of the section piece 10.

Referring again to FIG. 2, the bases 11 and 21 of the two section pieces are arranged substantially parallel to one another in order to form the front cross member 8 of the frame, and each lateral longitudinal member 6 or 7 includes two lateral branches 12, 22 and 13, 23 respectively, belonging to the two section pieces respectively.

These two lateral branches are associated with a metal fastening plate 30 which is arranged vertically and which is welded to the rear ends 12a, 22a and 13a, 23a respectively of the said two lateral branches.

Each of the two fastening plates 30 thus constitutes the rear end of one of the longitudinal members 6 and 7 and is furthermore provided with fastening holes 31 designed for the mounting of an articulation mechanism (not represented) which supports the backrest of the seat.

The fastening plates 30 could optionally constitute lateral flanges belonging to these articulation mechanisms.

The two fastening plates 30 are furthermore joined together by a rear cross member 32 consisting of a metal section piece.

In the example represented in the drawings, the lateral branches 22 and 23 of the section piece 20 are separated from each other slightly less than the lateral branches 12 and 13 of the section piece 10, and the rear ends 22a and 23a of the lateral branches of the section piece 20 are welded onto the inner faces of the fastening plates 30, while the rear ends 12a and 13a of the lateral branches of the section piece 10 are welded onto the outer faces of the fastening plates 30.

In addition, the rear ends of the lateral branches of the section piece 20 are arranged vertically above the rear ends of the lateral branches of the section piece 10.

Starting from their rear ends, the lateral branches belonging to the same lateral longitudinal member converge towards one another in the forwards direction. These two lateral branches intersect at their flattened regions 12b, 22b and 13b, 23b respectively, and the front part of the section piece 20 is arranged beneath the front part of the section piece 10.

Each lateral longitudinal member 6 and 7 includes a pivot 40 consisting of a rivet of horizontal axis, which joins together the two lateral branches 12, 22 and 13, 23 respectively, belonging to this lateral longitudinal member. These two pivots 40 are aligned on a common horizontal axis.

Moreover, the section piece 20 extends forwards beyond the base 11 of the section piece 10, and the two lateral branches 22 and 23 of this section piece 20 intersect the base 11 of the section piece 10. The two lateral branches 22 and 23 are welded at the lower part of the base 11 at two fastening points 33 situated at the intersections between the said lateral branches 22, 23 and the said base 11 respectively.

The two lateral longitudinal members 6 and 7 thus exhibit a cross-braced structure which is particularly strong.

The base 11 of the section piece 10 which is arranged relatively high up makes it possible to avoid "submarining", that is to say the person sitting in the seat slipping under the seat belt in the event of a front impact on the vehicle. To this end, the cross section of the base 11 is preferably greater than the cross section of the base 21.

Moreover, the base 21 of the section piece 20 allows the front part of a cover (not represented) covering the seat base cushion to be hooked on. This front part of the cover may have a vertical section in the shape of a crook which engages under the base 21 and the front portion of the section piece 20. The said front part of the cover is tightened over the front portion of the section piece 20 by pleating, or more specifically by gathering or using a drawstring.

In addition, the lateral branches 12 and 13 of the section piece 10, which constitute a lower portion of the seat base framework to the rear of the pivots 40, make it easy to fasten the lateral edges of the cover which covers the seat cushion.

This fastening may be obtained especially by pleating the lower edge of the cover which may be tightened around the frame 5 by passing under the lateral branches 12 and 13, without there being any risk of these lateral branches damaging the cover, by virtue of the fact that the said lateral branches 12 and 13 have a U-shaped cross section, the U being open towards the inside.

Furthermore, as may be seen in FIG. 6, the lateral branches 12 and 13 of the section piece 10 may include a lower rim 63 pointing towards the outside of the frame 5 in the flattened regions 12b and 13b, so as to constitute a bottom stop for the lower edge of the seat base cover, so as to prevent any interference between this cover and the front links 42 which will be described later.

Figure 4:
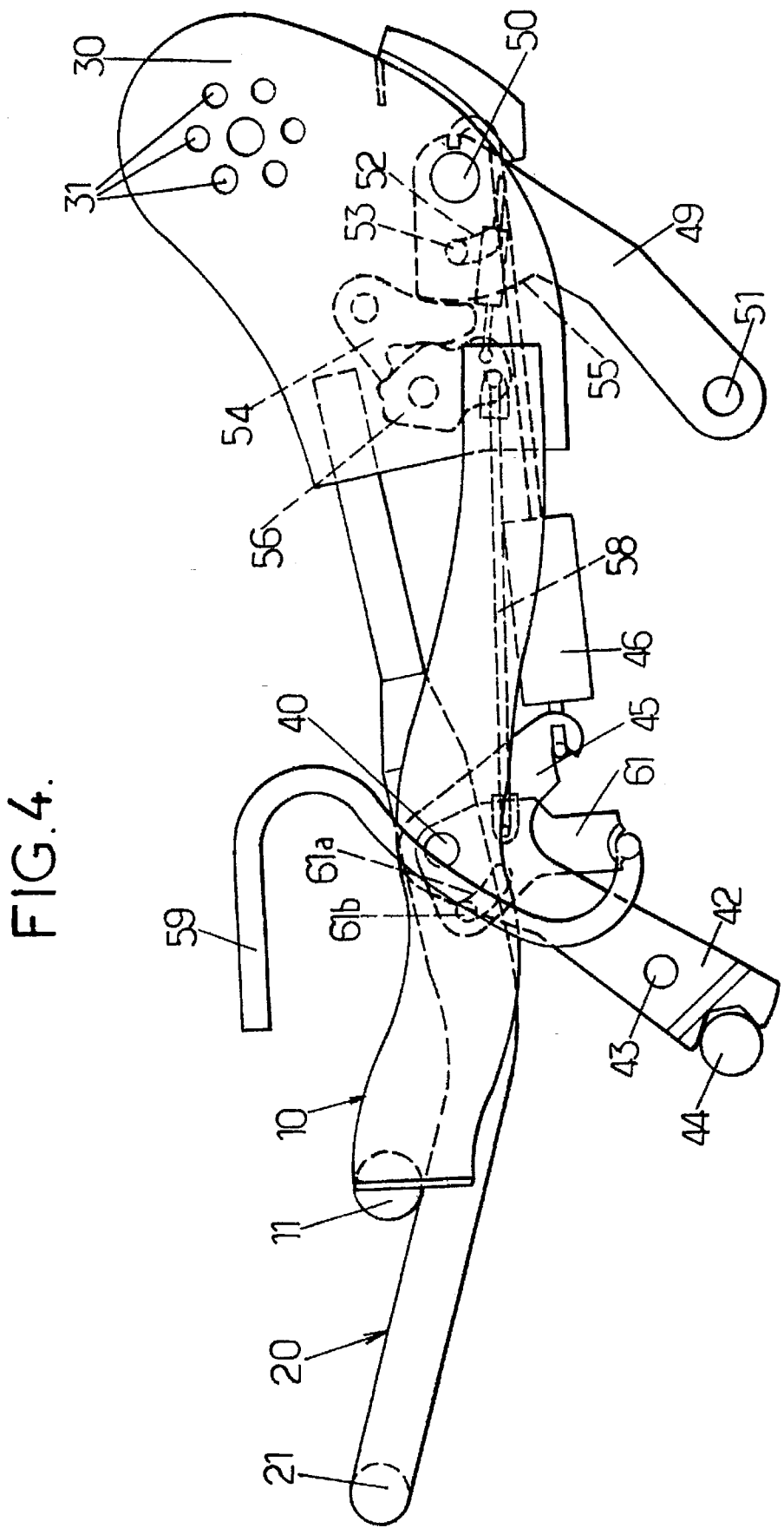

Furthermore, the seat base framework represented in FIGS. 2 to 6 includes an adjustment mechanism which makes it possible to vary the height of the base of the seat, as represented in particular in FIGS. 3 and 4.

This adjustment mechanism first of all includes two front links 42, just one of which is visible in the drawings.

These two front links are each mounted in the manner of journals on one of the pivots 40, and they consist of cutout sheet metal plates arranged in parallel vertical planes, mounted in the manner of fork joints between the flattened regions 12b, 22b and 13b, 23b respectively of the lateral branches of the section pieces.

Each of the two front links 42 is mounted so that it can pivot about a horizontal spindle 43, which is generally integral with a slideway (not represented) which allows longitudinal adjustment of the base of the seat.

In addition, the two front links 42 are joined together by a rigid tube 44 or some other rigid component, so that the movements of these two links are perfectly synchronized.

Finally, each front link 42 includes a lever arm 45 connected to one end of a coil spring 46, the other end of which is fastened to the rear cross member 32 so as to urge the front links 42 elastically towards a raised position, which corresponds to a high position of the seat base (see FIG. 4): thus height adjustment of the seat base by a person sitting in the seat is facilitated.

The height adjustment mechanism further includes two rear links 49 made of cutout sheet metal, on which the two fastening plates 30 are mounted by means of pivots 50.

The rear links 49 are mounted so that they can pivot on spindles 51 which are integral with the same slideways as the spindles 43 of the front links.

The rear links 49 could optionally be joined together by a rigid tube similar to the tube 44 for the purpose of synchronization, in which case the tube 44 of the front links 42 could, if need be, be omitted.

Each rear link 49 includes an oblong slot 52 which has the shape of an arc of a circle centred on the pivot 50 of the rear link, a peg 53 integral with the corresponding fastening plate 30 penetrating this slot so as to limit the angular travel of the rear link.

Each rear link 49, or more generally at least one of the links 42 and 49, is equipped with an immobilizing mechanism.

When this mechanism is provided on a link 49, it includes a toothed catch 54 interacting with a toothed sector 55 which belongs to the link 49 and which is centred on the pivot 50 of this link.

The catch 54 is mounted so that it can pivot on the fastening plate 30 corresponding to the link 49, and it can be moved between an immobilizing position, in which it immobilizes this link 49, and a non-obstructing position in which it allows the said link 49 to pivot.

A cam 56 which is also mounted so that it can pivot on the fastening plate 30 is urged elastically by a spring 57 so as to place the catch 54 in its immobilizing position, and this cam 56 may be moved away from the catch 54, allowing this catch to position itself in its non-obstructing position.

This actuation of the cam 56 is obtained by means of a linkage 58 actuated by a lever 59 which is preferably fastened to a sheet metal plate 61 pivoting on one of the aforementioned pivots 40.

When the two rear links 49 are provided with an immobilizing mechanism, as represented in FIG. 2, the control linkages 58 for these two mechanisms are joined together by a rigid rod 60 which makes it possible to synchronize control of the two immobilizing mechanisms, this rod 60 extending between the aforementioned sheet metal plate 61 which pivots on one pivot 40, and a similar sheet metal plate 61 which pivots on the other pivot 40.

Each plate 61 further includes an oblong slot 61a formed in the shape of an arc of a circle and centred on the corresponding pivot 40, one of the two section pieces 10 and 20 being integral with a peg 61b which penetrates this oblong slot with a view to limiting the angular travel of the plate 61.

The mounting of the seat base framework which has just been described is relatively simple.

This mounting first of all includes a preliminary step which consists in arranging the two section pieces 10 and 20, the front links 42 and the two fastening plates 30 already equipped with their immobilizing mechanism, in a mounting support known as a "locating jig".

With the two section pieces then arranged in a position close to the position which they are to occupy in the seat base framework, their lateral branches are fastened in pairs, riveting the pivots 40 to these lateral branches and to the front links 42 and to the plates 61 belonging to the controls of the immobilizing mechanism.

After this first fastening, the section pieces 10 and 20 can still pivot freely with respect to each other and the front links 42 are mounted in the manner of a fork joint between the two section pieces 10 and 20.

The base 11 of the section piece 10 is then pressed against the two lateral branches 22 and 23 of the section piece 20 by pivoting the two section pieces about the pivots 40, then the fastening points 33 are made by welding, preferably by resistance welding.

The two section pieces 10 and 20 are then fastened with respect to each other.

Next, the rear ends 12a, 13a and 22a, 23a respectively, of the two section pieces are fastened to the two fastening plates 30 by welding, and preferably by resistance welding.

The manufacturing method which has just been described makes it possible to minimize the stresses which may be imposed at the welds as a result of the assembly of the section pieces 10 and 20, which tends to increase the strength and reliability of the seat base framework while allowing wider tolerances on the dimensions of the section pieces 10 ad 20.

As an alternative, as represented in FIG. 7, the front links 42 and the rear links 47 could be replaced by non-rotating support legs 62, these support legs 62 being integral with the slideways which allow the longitudinal position of the seat base to be adjusted, the seat base framework otherwise remaining unchanged.

In the alternative of FIG. 7, the legs 62 may be mounted on the section pieces 10 and 20 and on the fastening plates 30 by the pivots 40 and 50 mentioned above.

The connection between the fastening plates 30 and the support legs 62 arranged towards the rear could however be a welded connection instead of being a pivot connection.

Optionally, the support legs 62 arranged towards the front could also be fastened to the section piece 10 and 20 by welding, although this method of fastening is not preferred within the context of the present invention.

I claim:

1. A seat base framework for a vehicle seat which has a seat base and a backrest, this framework including a frame made of section pieces which includes two lateral longitudinal members each one extending between a rear end and a front end, the respective rear ends of the two lateral longitudinal members being intended for the mounting of the backrest of the seat and the respective front ends of these longitudinal members being joined together by a front crossmember, in which the frame of the framework includes two rigid section pieces of similar dimensions which each have an overall U shape, with a base arranged toward the front and two lateral branches which extend backward from the base as far as rear ends, the respective bases of the two section pieces being arranged substantially parallel to one another to form the front cross member of the frame, each lateral longitudinal member being formed by two lateral branches belonging respectively to the two section pieces, associated with a vertical rigid fastening plate, the rear ends of these two lateral branches being separated from one another vertically and being fastened to said fastening plate, and the two section pieces being fastened rigidly to one another at two front fastening points situated respectively close to each lateral longitudinal member and toward the front of the frame.

2. The seat base framework as claimed in claim 1, in which the two rigid section pieces are fastened together by welding at the two front fastening points, the rear ends of the two section pieces also being fastened by welding to the two fastening plates, each lateral longitudinal member including a horizontal pivot which joins together the two lateral branches associated therewith, this pivot being arranged between, the front fastening point situated close to said lateral longitudinal member and the rear ends of said two lateral branches, and the two pivots corresponding to the two lateral longitudinal members being aligned on a common axis.

3. The seat base framework as claimed in claim 2, in which the two lateral branches of one of the two rigid section pieces, forming a first section piece are separated from each other slightly less than the two lateral branches of the other of the two rigid section pieces, forming a second section piece, the two lateral branches of the first section piece extending forward beyond the base of the second section piece, and the two front fastening points each consisting of a point of contact between one lateral branch of the first section piece and the base of the second section piece.

4. The seat base framework as claimed in claim 3, in which the two lateral branches of the section piece which belong to the same lateral longitudinal member intersect vertically as the pivot which joins them together.

5. The seat base framework as claimed in claim 3, in which the first section piece includes a front portion which is arranged under said base of the second section piece.

6. The seat base framework as claimed in claim 2, in which each pivot which joins together each lateral branch of the section pieces is also joined to a support leg which supports the seat base framework and is mounted in the manner of a fork joint between said lateral branches of the two section pieces.

7. The seat base framework as claimed in claim 6, in which the support leg is a first articulated link allowing height adjustment of the seat base framework.

8. The seat base framework as claimed in claim 7, in which each of the fastening plates-is also mounted on a second articulated link allowing height adjustment of the seat base framework.

9. The seat base framework as claimed in claim 7, further including a mechanism for immobilizing the links, this mechanism being controlled by means of a lever mounted so that it can pivot on at least one of the two pivots which join together the lateral branches of the rigid section pieces.

10. The seat base framework as claimed in claim 1, in which the lateral branches of the section piece which belong to the same lateral longitudinal member exhibit a lower lateral branch including at least one substantially horizontal lower rim which extends toward the inside of the frame.

11. A method for manufacturing a seat base framework for a vehicle seat which has a seat base and a backrest, this framework including a frame made of section pieces which includes two lateral longitudinal members each one extending between a rear end and a front end, the respective rear ends of the two lateral longitudinal members being intended for the mounting of the backrest of the seat and the respective front ends of these longitudinal members being joined together by a front crossmember, in which the frame of the framework includes two rigid section pieces of similar dimensions which each have an overall U shape, with a base arranged toward the front and two lateral branches which extend backward from the base as far as rear ends, the respective bases of the two section pieces being arranged substantially parallel to one another to form the front cross member of the frame, lateral longitudinal member being formed by two lateral branches belonging respectively to the two section pieces, associated with a vertical rigid fastening plate, the rear ends of these two lateral branches being separated from one another vertically and being fastened to said fastening plate, and the two section pieces being fastened rigidly to one another at two front fastening points situated respectively close to each lateral longitudinal member and toward the front of the frame, and in which the two rigid section pieces are fastened together by welding at the two front fastening points, the rear ends of the two section pieces also being fastened by welding to the two fastening plates, each lateral longitudinal member including a horizontal pivot which joins together the two lateral branches associated therewith, this pivot being arranged between the front fastening point situated close to said lateral longitudinal member and the rear ends of said two lateral branches, and the two pivots corresponding to the two lateral longitudinal members being aligned on a common axis, this method including the following steps:

a) placing the two section pieces in a position close to the position which they are to occupy in the seat base framework,
   b) fastening the lateral branches of these section pieces together in pairs by means of the pivots,
   c) welding the two section pieces together at the two front fastening points,
   d) and welding the rear ends of the two section pieces to the fastening plates.

12. A method for manufacturing the seat base framework for a vehicle seat which has a seat base and a backrest, this framework including a frame made of section pieces which includes two lateral longitudinal members each one extending between a rear end and a front end, the respective rear ends of the two lateral longitudinal members being intended for the mounting of the backrest of the seat and the respective front ends of these longitudinal members being joined together by a front crossmember, in which the frame of the framework includes two rigid section pieces of similar dimensions which each have an overall U shape, with a base arranged toward the front and two lateral branches which extend backward from the base as far as rear ends, the respective bases of the two section pieces being arranged substantially parallel to one another to form the front cross member of the frame, each lateral longitudinal member being formed by two lateral branches belonging respectively to the two section pieces, associated with a vertical rigid fastening plate, the rear ends of these two lateral branches being separated from one another vertically and being fastened to said fastening plate, and the two section pieces being fastened rigidly to one another at two front fastening points situated respectively close to each lateral longitudinal member and toward the front of the frame, in which the two rigid section pieces are fastened together by welding at the two front fastening points, the rear ends of the two section pieces also being fastened by welding to the two fastening plates, each lateral longitudinal member including a horizontal pivot which joins together the two lateral branches associated therewith, this pivot being arranged between the front fastening point situated close to said lateral longitudinal member and the rear ends of said two lateral branches, and the two pivots corresponding to the two lateral longitudinal members being aligned on a common axis, and in which each pivot which joins together each lateral branch of the section pieces is also joined to a support leg which supports the seat base framework and is mounted in the manner of a fork joint between said lateral branches of the two section pieces, this method including the following steps:

a) placing the two section pieces and two support legs in a position close to the position which they are to occupy in the seat base framework,
   b) fastening the lateral branches of the section pieces together in pairs by means of the pivots, mounting the two support legs in the manner of a fork joint between lateral branches of the two section pieces,
   c) welding the two section pieces together at the two front fastening points,
   d) and welding the rear ends of the two section pieces to the fastening plates.

* * * * *